May 6, 1924.

R. J. O'NEILL

FECES SCALE

Filed March 30, 1922

Inventor

Robert J. O'Neill

By Benjamin Webster his Attorney

May 6, 1924.
R. J. O'NEILL
1,493,222
FECES SCALE
Filed March 30, 1922  2 Sheets-Sheet 2
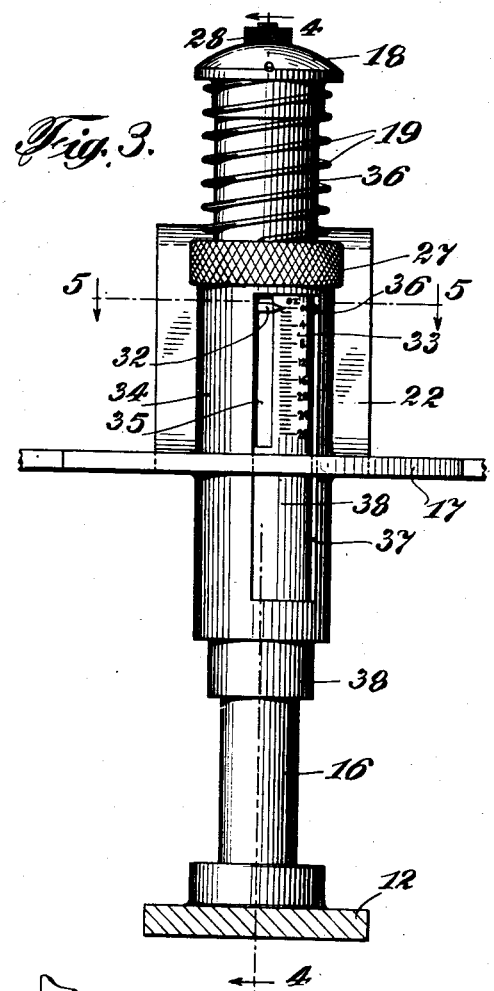
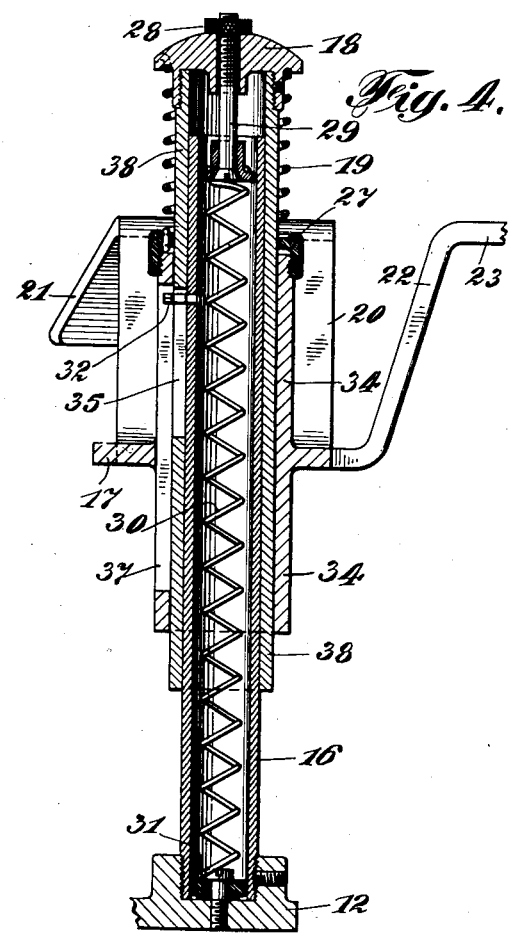
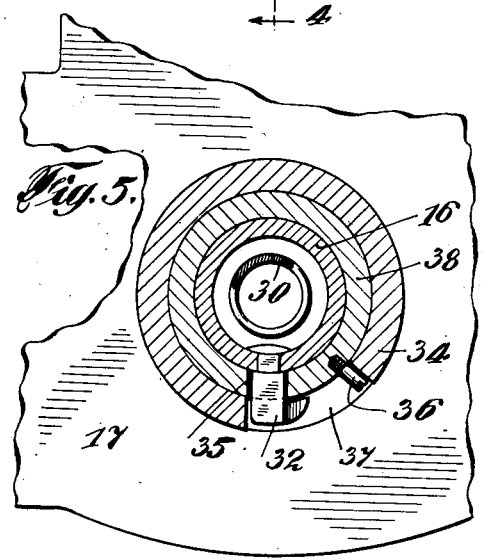
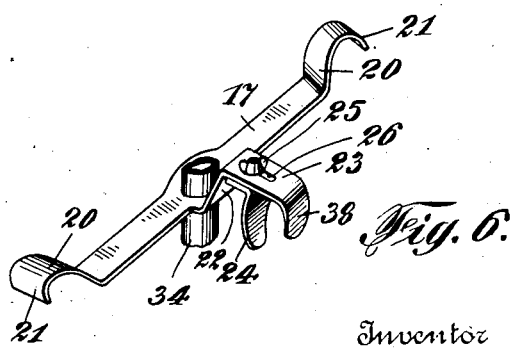
Inventor
Robert J. O'Neill
By Benjamin Webster
his Attorney Patented May 6, 1924.

1,493,222

UNITED STATES PATENT OFFICE.

ROBERT J. O'NEILL, OF ASTORIA, NEW YORK, ASSIGNOR TO THE INTERNATIONAL HEALTH APPLIANCE COMPANY, A CORPORATION OF DELAWARE.

FECES SCALE.

Application filed March 30, 1922. Serial No. 548,038.

*To all whom it may concern:*

Be it known that I, ROBERT J. O'NEILL, a citizen of the United States, and resident of Astoria, Long Island, in the county of Queens and State of New York, have invented certain new and useful Feces Scales, of which the following is a specification.

This invention relates to scales or weighing devices and more particularly to those adapted to be supported in suspension.

This invention, which is similar generically to that of application, Ser. No. 548,039, filed March 30, 1922, has for its objects, among others, to provide scales suitable for receiving and weighing feces and urine as deposited;

To provide scales with a detachable receptacle;

To provide scales with a washable receptacle;

To provide scales adapted to be suspended in any of the several forms of chamber now in use, particularly those having a pool of standing water therein;

To provide scales fixed in a support adapted to rest upon any of the several sizes of chamber now in use;

To provide scales and a support therefor so that the receptacle can be readily flushed with the water which flushes the chamber;

To provide scales and a support therefor adjustable to chambers of different size;

To provide scales and a support therefor having means for adjusting the position of the receiving tray;

To provide scales and a support therefor having means for raising and lowering the receiving tray;

Other objects will appear as the description proceeds.

Reference is made to the drawings for a detailed description of one embodiment of my invention in which Figure 1 is a lengthwise vertical section showing my invention applied to the form of chamber in which there is a shallow basin of water constantly standing.

Figure 3 is a front elevation of the scales or weighing device mounted on the support, showing the compression spring support which permits lowering the scale receptacle into the standing water;

Figure 4 is a vertical section taken on the line 4—4 of Figure 3, looking in the direction of the arrows;

Figure 5 is a horizontal section taken on the line 5—5 of Figure 3, looking in the direction of the arrows, and Figure 6 is a perspective view of a support whose arms are specially modified for securely clamping the feces weighing device on a child's pot or chamber.

Figure 1:
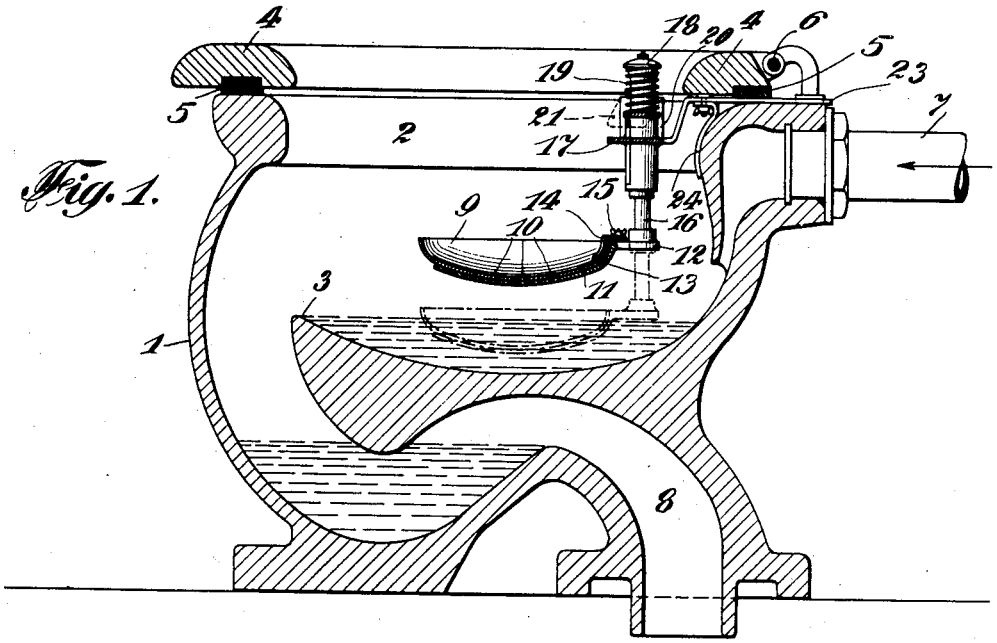
Figure 2:
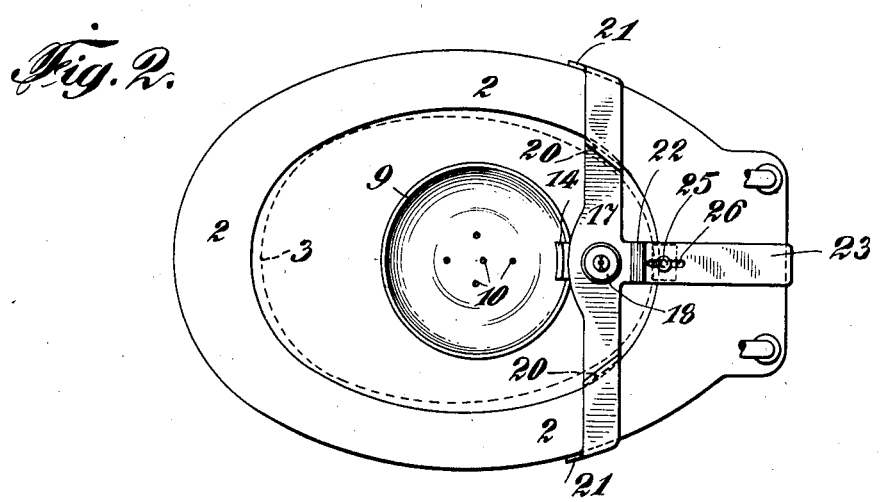
Figure 2 is a plan view with the wooden seat removed.

Referring to Figure 1 there is shown a chamber 1 of porcelain terminating at the top in the usual elliptical rim 2. Within the chamber is the shallow basin 3 normally filled to the front edge with standing water. Overlying the rim 2 is the usual wooden seat 4 which rests upon rubber cushions 5 which also space the bottom of the seat from the top of the porcelain rim. The seat 4 is mounted on hinges 6.

To flush or wash the basin 3 water is introduced through the pipe 7 under high pressure so that every part of the basin is thoroughly washed by splashing and the waste is carried out through drain pipe 8.

In this embodiment of my invention the water which washes the basin 3 is utilized to wash the weighing receptacle or tray 9 by lowering it to the position shown in dotted lines in Figure 1. Upon elevating the tray 9 for another weighing the water drains off through the apertures 10.

The tray 9 which is of vitreous material rests upon and is supported by the fan-shaped metallic extension 11 from the support 12. The tray 9 is held securely in position on the support 11 by the overlying rubber cushion 13 which is firmly pressed against the tray by the clamp 14 which is tightened by the wing nut 15. The support 12 is secured in the horizontal position on the end of the shaft 16.

The weighing device is centrally positioned on the flat support 17 which is adapted to underlie the rim of the chamber 1 a sufficient amount to prevent the top 18 from reaching above the top of wooden seat 4. This is accomplished by the inclined parts 20 in the side arms, which terminate in clamps 21 adapted to overlie the rim 2 of the chamber 1 at a point to the rear of the transverse diameter of the chamber so that any forward pressure on the support 17 tends to wedge arms 21 securely against the outside of rim 2, and inclined part 22 in the rear arm which has an extension 23 terminating in suitable clamps at the rear. The arm 23 is provided with a longitudinal slot 26 which permits the adjustment of arm 24 so that it may be fastened snug against the inside of the rim 2 at the rear. When seat 4 is down the support is rigidly secured against movement in any direction and the tray 9 is held in position to receive feces as deposited.

Mounted directly in the support 17 is the cylindrical sleeve 34 which carries at the top the screw-threaded collar 27 to which is fastened the compression spring 19 which underlies the shoulder of cap 18 and so supports the weighing device. To lower the weighing device to the dotted-line position shown in Figure 1 for washing it is simply necessary to press down on the cap 18. Upon releasing the pressure the tray 9 is elevated by the spring 19.

The cylindrical shaft 16 in which is fixed the indicator 32 is adapted to slide in the cylindrical sleeve 38 which has a slot 35 therein and beside the slot, a scale 33 graduated in ounces.

The scale spring 30 is fastened at 31 to the support 12 and is secured to the bolt 29. The nut 28 both suspends the bolt 29 in the cap 18 and permits adjustment of the scale to the zero position. The cutaway portion 37 in sleeve 34 permits the scale 33 to be seen and its edges form guides for the indicator 32 and the set-screw 36, thus preventing relative rotation of the sleeves 16 and 38.

In Figure 6 is shown the support specially adapted for a child's chamber or pot. The extension 38 forms with the arm 24 a clamp adapted to secure the support down on the pot.

The operation is obvious. After the feces are deposited a reading is made. Then to wash the tray the finger is pressed down on the cap 18 and the closet simultaneously flushed.

Having now described my invention, it will be obvious to those skilled in the art that many modifications may be made in the structural details without departing from the spirit of the invention and I do not therefore wish to be limited except as in the appended claims.

I claim:

1. In a weighing device especially adapted for weighing feces as excreted, in combination a support, a scales comprising a receptacle for receiving the feces as deposited, and means for yieldingly supporting said scales to permit the same to be lowered and returned and normally maintained in an operative position.

2. In a weighing device especially adapted for weighing feces as excreted, in combination a support, a scales comprising a receptacle for receiving feces as deposited, a shaft for supporting said receptacle, and means for yieldingly supporting said receptacle and shaft permitting the same to be lowered and upon being released to be automatically returned and normally maintained in an operative position.

3. In a weighing device especially adapted for weighing feces as excreted, in combination a support, means for clamping said support to a chamber, a scales comprising a receptacle for receiving feces as deposited and a compression spring mounted on said support and supporting said scales.

4. In a weighing device especially adapted for weighing feces as excreted, in combination a support, a scales comprising a receptacle for receiving feces as deposited, a shaft to which said receptacle is connected, a sleeve mounted on said support through which said shaft reciprocates, and a spring fixed to said sleeve and supporting said shaft.

5. In a weighing device especially adapted for weighing feces as excreted, in combination a support adapted to be fixed on a chamber, a scales comprising a receptacle for receiving feces as deposited, a shaft supporting said receptacle, means for securing said shaft in a position such that the receptacle overlies the water in the chamber a predetermined height, and means for lowering said shaft to a position such that the receptacle may be readily flushed by the water in the chamber.

6. In a weighing device, especially adapted for weighing feces as excreted, in combination a support, a scales comprising a receptacle for receiving feces as deposited, a shaft supporting said receptacle, a sleeve mounted on said support through which said shaft reciprocates, and a compression spring fixed to said sleeve and supporting said shaft.

7. In a weighing device especially adapted for weighing feces as excreted, in combination a support, a scales comprising a receptacle for receiving feces as deposited, a shaft supporting said receptacle, a sleeve mounted on said support through which said shaft reciprocates, and a compression spring attached to an element that is detachably secured to said sleeve, said spring supporting said scales shaft.

8. In a weighing device especially adapted for weighing feces as excreted, in combination a support, a scales comprising a receptacle for receiving feces as deposited, a shaft supporting said receptacle, a sleeve mounted on said support through which said shaft reciprocates, a screw-threaded collar mounted on said sleeve, and a compression spring fixed to said collar and supporting said shaft.

9. In a weighing device especially adapted for weighing feces as excreted, in combination a support adapted to be fixed on a chamber, a scales comprising a receptacle for receiving feces as deposited, a shaft supporting said receptacle, a sleeve mounted on said support through which said shaft reciprocates, a screw-threaded collar mounted on said sleeve, a compression spring fixed to said collar and supporting said shaft, said cap supporting the scales and comprising means for adjusting said scales, and affording means for pressure with the finger for flushing the receptacle after each weighing.

Signed at New York in the county of New York and State of New York this 29th day of March A. D. 1922.

ROBERT J. O'NEILL.